(12) United States Patent
Haab et al.

(10) Patent No.: US 6,647,590 B2
(45) Date of Patent: Nov. 18, 2003

(54) FIXING DEVICE FOR A RAIL

(75) Inventors: Karl Haab, Weggis (CH); Otto Haab, Mettmenstetten (CH)

(73) Assignee: Hawa AC, Mettmenstetten (CH)

( * ) Notice: Subject to any disclaimer, the term of this patent is extended or adjusted under 35 U.S.C. 154(b) by 0 days.

(21) Appl. No.: 09/948,695

(22) Filed: Sep. 10, 2001

(65) Prior Publication Data

US 2002/0044824 A1 Apr. 18, 2002

(30) Foreign Application Priority Data

Oct. 13, 2000 (EP) .............................................. 00810947

(51) Int. Cl.[7] .............................................. E05D 15/00
(52) U.S. Cl. .............................. 16/90; 16/95 R; 16/94 R
(58) Field of Search ........................ 16/90, 87.2, 87 R, 16/91, 95 R, 94 R; 160/902, 178.1; 248/262; 49/404, 462; 411/553, 551, 550, 549, 349, 84

(56) References Cited

U.S. PATENT DOCUMENTS

| 1,791,527 A | * | 2/1931 | Hoffman .................... 104/108 |
| 3,029,465 A | * | 4/1962 | Graber et al. ................ 16/94 D |
| 3,879,799 A | * | 4/1975 | Williams .................... 104/94 |
| 3,916,477 A | * | 11/1975 | Baker, Sr. ................... 16/94 D |
| 4,079,770 A | * | 3/1978 | Woodle ........................ 160/19 |
| 4,173,382 A | * | 11/1979 | Booty ......................... 174/48 |
| 4,254,813 A | * | 3/1981 | Vecchiarelli ................. 160/19 |
| 4,299,008 A | * | 11/1981 | Burns ......................... 16/95 D |
| 4,662,421 A | * | 5/1987 | Basmadji et al. ............ 16/94 D |
| 5,206,972 A | * | 5/1993 | Nudelmont et al. .......... 16/108 |
| D381,890 S | * | 8/1997 | Levy .......................... D8/377 |
| 6,007,286 A | * | 12/1999 | Toyota et al. ............... 411/428 |

FOREIGN PATENT DOCUMENTS

| DE | 36 02 567 A1 | 7/1987 |
| DE | 195 07 715 C 1 | 8/1996 |
| DE | 198 42 567 A 1 | 4/1999 |
| DE | 297 23 734 U 1 | 5/1999 |
| DE | 299 22 481 U 1 | 4/2000 |

* cited by examiner

Primary Examiner—Gary Estremsky
Assistant Examiner—Mark Williams
(74) Attorney, Agent, or Firm—Oliff & Berridge, PLC

(57) ABSTRACT

The fixing device which serves for retaining a rail (1), in particular a running or guide rail, has a strip (2) which is provided with an angular profile and can be connected with little outlay on one side to a wall (9) and on the other side to a rail (1). The strip (2) has two limbs (21; 22) which are provided for holding the rail (1), the first limb (21) of which is provided with openings (23) for the passing through of fixing screws (24) which can be connected to the wall (9), and the second limb (22) of which is provided with a T-profile-shaped longitudinal slot (25) which is open towards the rail (1) and serves for holding and for retaining a locking element (3) which preferably has a thread (31) for a mounting screw (32) which can be connected to the rail (1), or is connected fixedly to said mounting screw.

9 Claims, 3 Drawing Sheets

Figure 1:
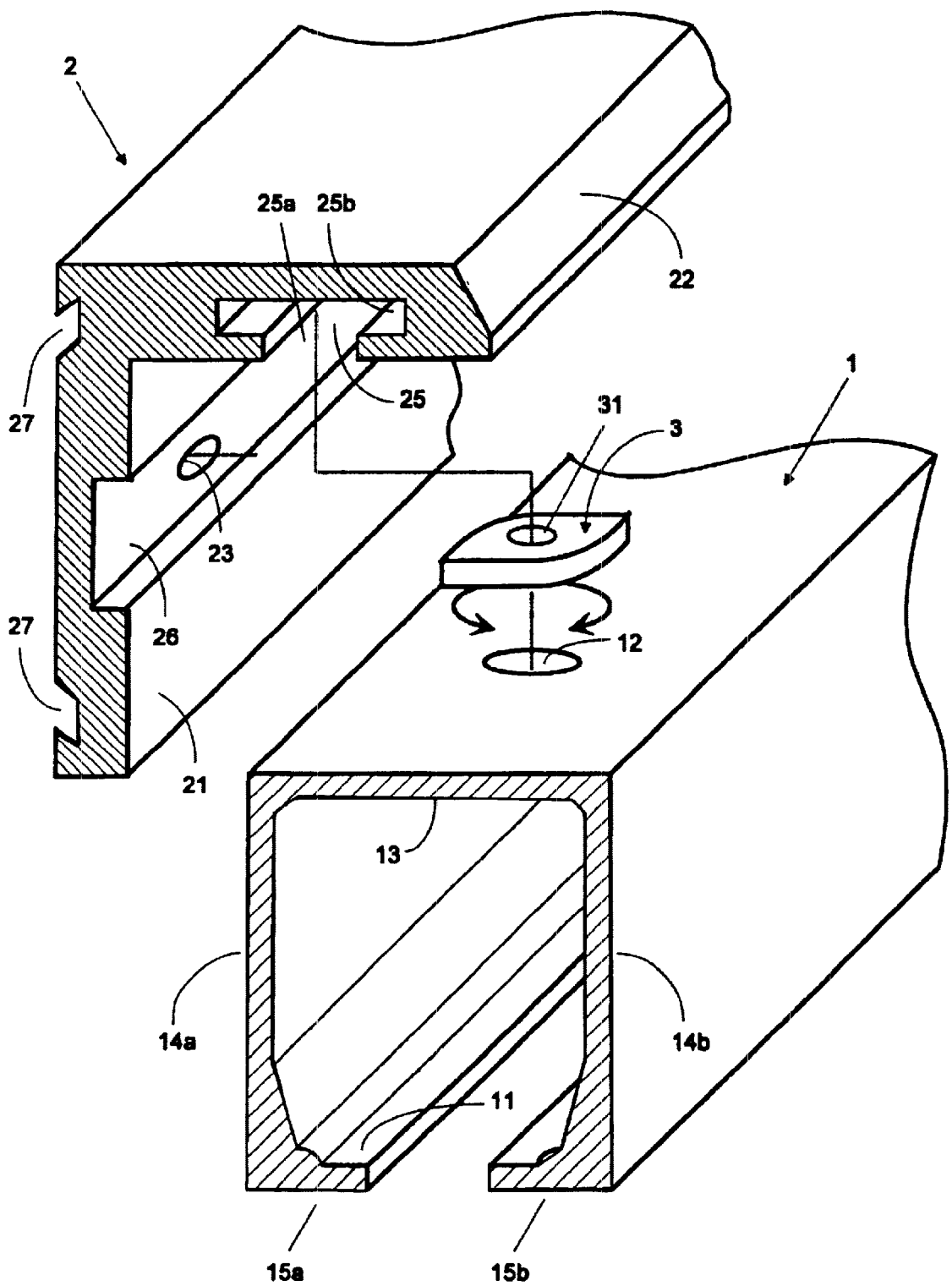

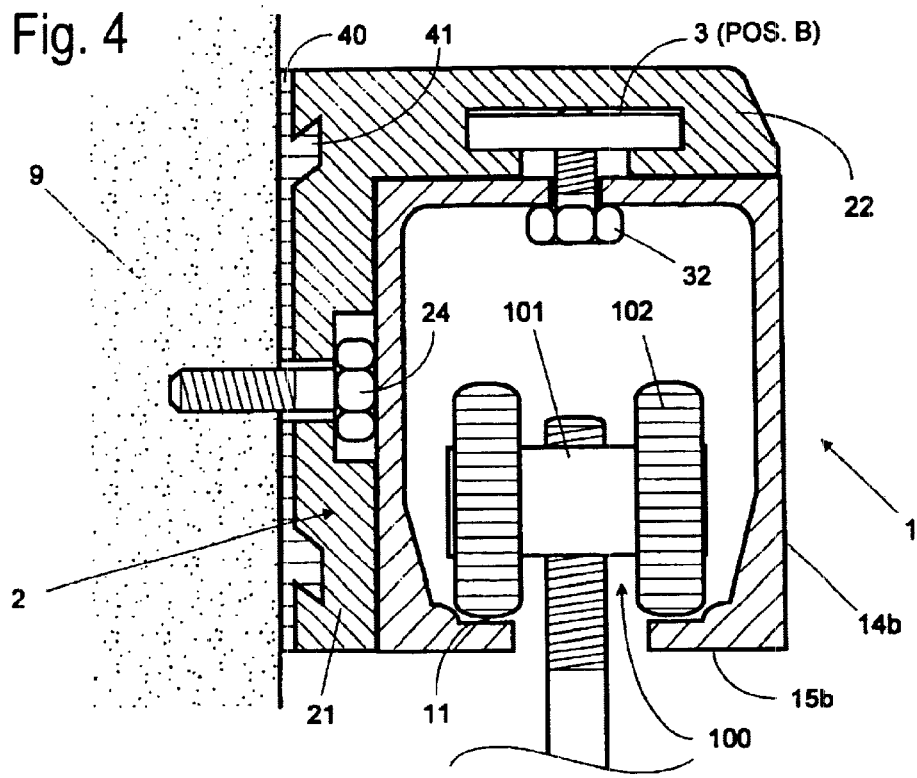
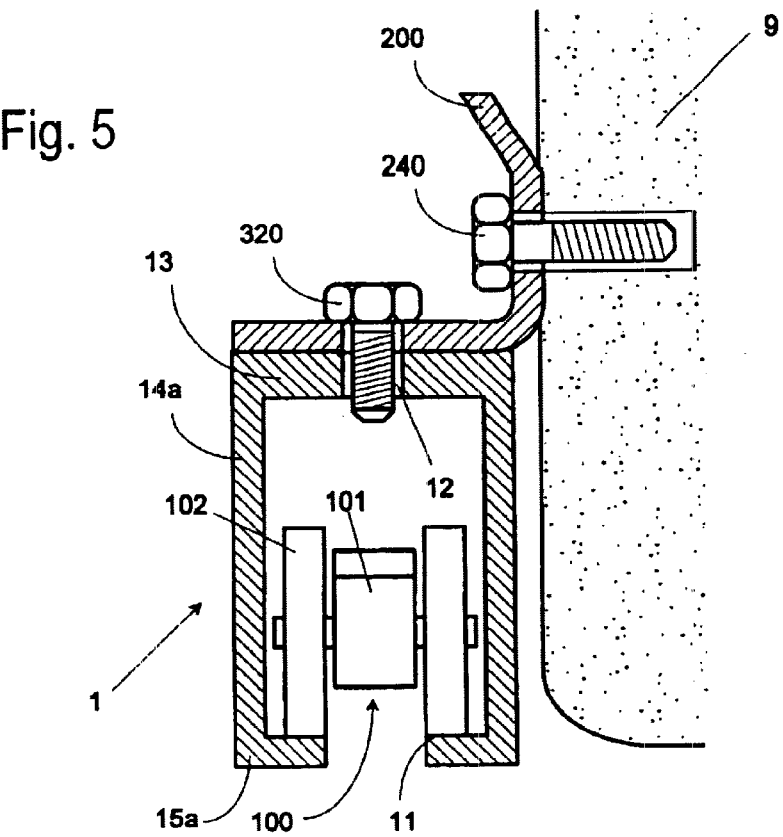

FIXING DEVICE FOR A RAIL

The invention relates to a fixing device for a rail, in particular a running or guide rail for sliding fittings, in accordance with the precharacterizing clause of Patent claim 1.

Sliding doors which serve for shutting off and/or dividing rooms are normally suspended on a running mechanism which is guided in a rail. Rails of this type, which are normally fixed to the ceiling or to a side wall, and running-mechanism mountings suitable for them are described, for example, in the 2000 catalogue "Schiebebeschläge/Baubeschläge [Sliding fittings/building fittings]" glass/metal from HAWA AG, Mettmenstetten (see, for example, page 14). This shows, among other things, that rails which have, for example, a U profile, are connected to the masonry by means of screws which are guided through holes in the rail. As DE-A1 3201 121 shows, the running and guide rails can also have flanges which are provided with holes for the fixing screws. Furthermore, WO 00/55460 reveals a rail which is provided with threaded holes and is connected to a wall by means of fixing screws and an angular element (see FIG. 5 below).

For mounting purposes, these rails therefore have to be provided, at a correspondingly high outlay, with the necessary holes, if appropriate with threaded holes, generally at the installation site. During the making of the holes, because of the metal-removing machining of the rail metal, particles often get onto the running surfaces of the rail, as a result of which damage can be caused to the wheels of the running mechanisms and the resultant running characteristics can be negatively affected. In addition, further damage due to scratches or distortion of the rail may arise during the mechanical machining and because of the direct mounting of the rail onto the masonry.

During the mounting of the rails, in particular in the context of renovation work, further problems may arise, depending on the structure of the material of the mounting locations.

As can be seen, for example, in DE-A1 3201 121, fixing means which are used, such as flanges, screws, etc., which remain visible after the rail has been mounted, can also have an annoying effect.

The present invention is therefore based on the object of providing a fixing device by means of which a rail, in particular a running or guide rail for sliding fittings, can be fitted with little outlay and without the occurrence of the disadvantages described above.

This object is achieved by a fixing device which has the features specified in claim 1. Advantageous refinements of the invention are specified in further claims.

The fixing device which serves for retaining a rail, in particular a running or guide rail, has a strip which is provided with an angular profile and can be connected with little outlay on one side to a wall and on the other side to a rail. The strip has two limbs which are provided for holding a rail, the first limb of which is provided with openings for the passing through of fixing screws which can be connected to the wall, and the second limb of which is provided with a T-profile-shaped longitudinal slot which is open towards the rail and serves for holding and for retaining a locking element which preferably has a thread for a mounting screw which can be connected to the rail.

The solution according to the invention gives rise to various advantages during production, mounting and during subsequent operation of the individual parts of the device. The rail and the strip provided for holding it can already be provided during the manufacturing with holes for the fixing and the mounting screws. Drilling and/or thread cutting during the mounting of the device is/are omitted, so that at the same time soiling or mechanical impairment of the rail is avoided. This ensures optimum functioning of the rail and of running mechanisms guided therein. The strip can be provided with a plurality of openings for fixing screws, since, after the device has been mounted, said openings together with the fixing screws are covered by the mounted rail and therefore do not have an annoying effect. Since the locking elements can be introduced into the longitudinal slot in any desired positions of the strip, the rail can likewise be provided with pre-manufactured holes which serve for the passing through of the mounting screws.

The mounting of the rail into the pre-fitted strip can therefore take place in a few moves. The locking element is introduced for this purpose into the longitudinal slot of the strip, rotated from position A into position B and subsequently tightened by rotating in the same direction. Of course, the release and refitting of the rail with the same parts is also possible in a similarly simple manner.

The dimensions of the rail and of the strip are preferably matched to one another, so that after the mounting is finished they visually form one unit. The inside of the strip is covered, so that no flanges or tabs can be seen. This design of the rail and strip enables their ends to advantageously be provided with a covering element which conceals any differences in length between the rail and strip there.

The mounting of the strip on walls of different material can take place without any problem. There are no special requirements made of the structure and design or the substrate to be provided with a rail, so that the device according to the invention can particularly advantageously be used even in renovations and reconstructions of buildings.

In a preferred refinement, the strip can also be connected in a simple manner to one or more spacer elements by means of which the distance of the rail from the wall can be set.

The rail preferably has at least approximately a U profile. However, it may also have other profile shapes. Furthermore, the use of double rails is possible. In this case, the corresponding limb of the strip preferably has two longitudinal slots running parallel.

Figure 2:
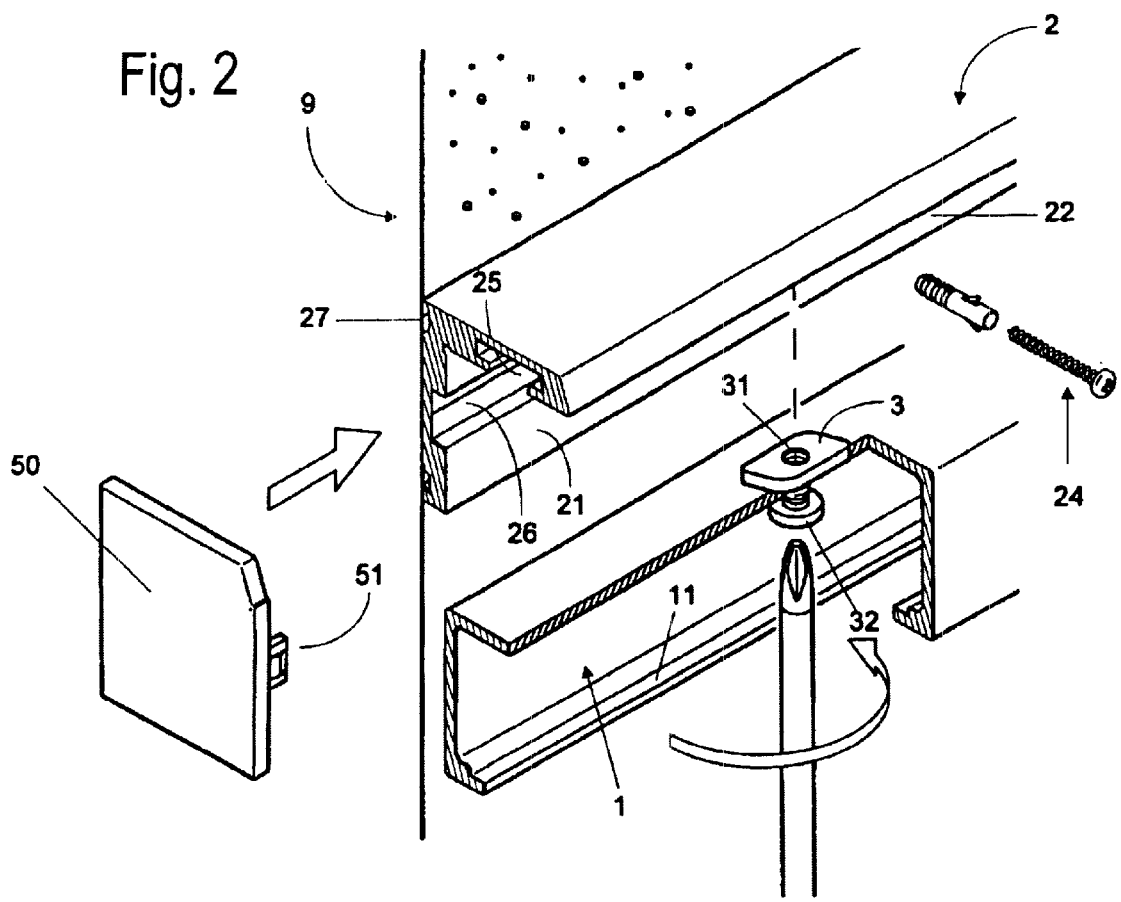
Figure 3:
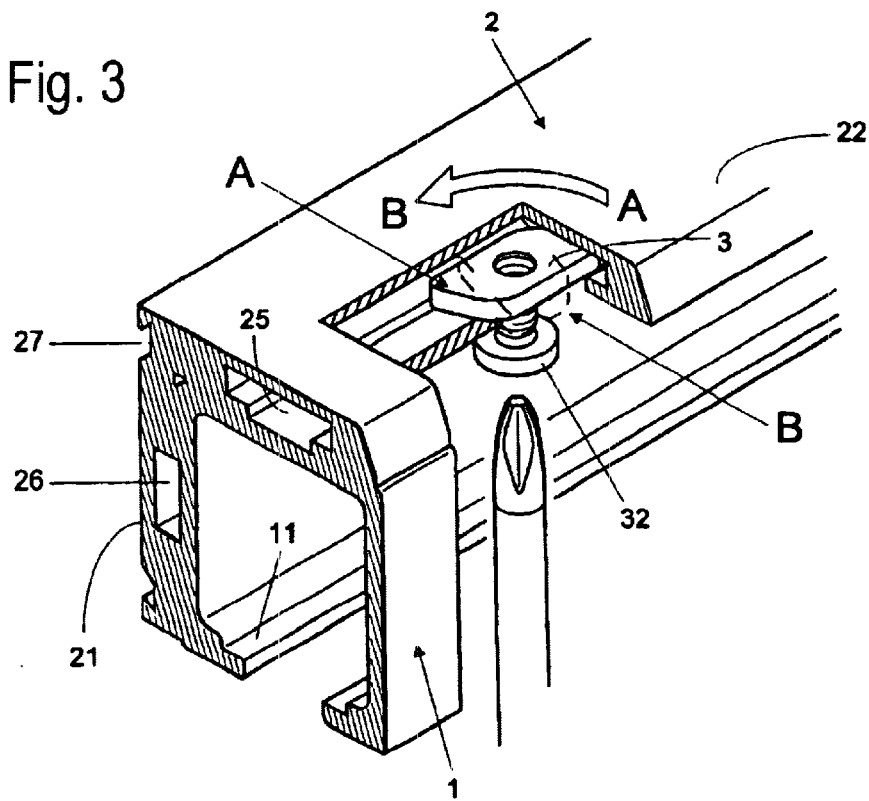

The invention will be explained in greater detail below with reference to a drawing, in which:

FIG. 1 shows a fixing device according to the invention with a rail 1 and a strip 2 in a preferred refinement, FIG. 2 shows the fixing device according to the invention with a rail 1, which is shown in section, during the mounting, FIG. 3 shows the fixing device according to the invention with a rail 1 and strip 2, which are shown in section, during the mounting, FIG. 4 shows the fixing device according to the invention with a rail 1 and strip 2, which are shown in section, after the mounting, and FIG. 5 shows a fixing device which is known from the prior art for a rail 1.

FIG. 5 shows a fixing device which is known from laid-open application WO 00/55460 and has an angular piece 200 which is screwed on one side to a wall 9 by means of a fixing screw 240 and on the other side to a rail 1 by means of a mounting screw 320. The approximately U-profile-shaped rail 1 comprises a back element 13, at whose ends limbs 14a, 14b which run parallel and have terminating, mutually facing foot pieces 15a, 15b are provided and whose upper sides form the running surfaces 11 for the wheels 102 of a running mechanism 100 which serves for carrying a displaceable element, for example a door or a partition.

The disadvantages described at the beginning of a device of this type can be seen clearly in FIG. 5. The rail 1 has to be provided at suitable points with threaded holes 12 for the mounting screws 320 which are screwed from above into the back element 13 of the rail 1. The machining of these parts may result, as described above, in soiling of the running rail 1 and in a corresponding impairment of the operating characteristics of the running mechanism 100. When the device is released and displaced in order to adjust the position of the rail 1, new holes may have to be provided, again with an appropriate outlay. Also, the mounting elements, the angular piece 200 and fixing and mounting screws 240, 320 are not covered, which means that the aesthetic impression of the fitted device is not very satisfactory.

FIG. 1 shows a fixing device according to the invention having a strip 2 which is preferably manufactured from light metal and has an angular profile which is formed by two limbs 21, 22, which are perpendicular with respect to each other, into which profile a rail 1 is fitted. The first, vertical limb 21 has openings 23 for the passing through of fixing screws 24 which are to be connected to a wall 9 (see FIG. 4). The second, horizontal limb 22 has a T-profile-shaped longitudinal slot 25 which is open towards the rail 1 and serves for holding and for retaining a locking element 3, which can be inserted through an outer partial slot 25a of relatively small dimensions into an inner partial slot 25b of larger dimensions and can be rotated there from a first position A into a second position B (see FIG. 3).

The locking element 3 preferably has a thread 31 for a mounting screw 32 which is, for example, guided through a hole 12 in the back element 13 and can thereby be connected to the rail 1 and after the positioning of the locking element 3 can be tightened. However, a fixed connection is possible between the mounting screw 32 and the locking element 3, which element is designed in such a manner that it wedges in the longitudinal slot 25 when it is rotated.

The openings 23 serving for the passing through of the fixing screws are preferably arranged in a depression suitable for holding the head of the fixing screw 24, preferably in a channel 26 running along the first limb 21. As a result, a standard rail can be used and can be fitted and fixed between the limbs 21, 22 of the strip 2.

Since the head of the fixing screw 24 is embedded in the channel 26, the limb 14 of the rail 1 also rests over its entire surface on the limb 21 of the strip 2, which makes it possible to absorb laterally acting loads.

In the centre, the channel 26 is preferably additionally provided with a continuous drilling notch, which simplifies any necessary drilling of additional holes.

It can furthermore be seen from FIG. 1 and FIG. 4 that, on the side facing away from the rail 1, the first limb 21 is provided with longitudinal grooves 27 which serve for holding retaining splines 41 of a spacer element 40 which permits simple setting of the distance of the rail 1 from the wall.

The mounting of the rail 1 can readily be seen from FIG. 2 and FIG. 3. FIG. 2 shows the fixing device according to the invention with the rail 1, which is illustrated in section, during the mounting. FIG. 3 shows the fixing device according to tile invention with the rail 1 and strip 2, which are shown in section. It can be seen from FIG. 3 that the locking element 3, which is connected to the mounting screw 32, is guided, with its orientation running along the rail 1, into the longitudinal slot 25 and is rotated there from a position A into a position B until it locks and, if appropriate, wedges within the longitudinal slot 25. In the arrangement according to FIG. 3, the locking element 3 is provided with a thread 31, so that the mounting screw 32 can be tightened as soon as the locking element 3 reaches the position B.

The locking element 3 is preferably of cuboidal design, is rounded and is optionally provided with inclined surfaces, by means of which the locking element 3 is displaced downwards when rotated within the longitudinal slot 25, the rail 1 is tightened as a result and is wedged in the vicinity of the stop.

If the locking element 3 has a thread 31, the latter or the associated mounting screw 32 is preferably provided with a viscous substance or paint which entrains the locking element 3 when the mounting screw 32 is rotated from position A to position B.

FIG. 2 also shows a covering 50 which can be placed onto the ends of the rail 1 and strip 2, which ends are not arranged flush, if appropriate. The covering 50 is preferably provided with pins 51 which can be inserted into the T-profile-shaped longitudinal slot 25 or the channel 26.

FIG. 4 shows the ready fitted fixing device with a rail 1 and strip 2, which are illustrated in section. It can be seen that the lengths of the limbs 21, 22 are selected in accordance with the dimensions of the rail 1, so that steps at the transitions between the rail 1 and strip 2 are avoided, as a result of which, and with flanges or further fixing elements being avoided, visually one unit comprising the rail 1 and strip 2 is obtained. The dimensions of the spacer element 40 have likewise been matched to the associated limb 21 of the strip 2.

What is claimed is:

1. Fixing device for a rail (1), having a mounting element which can be connected on one side of a wall (9) and on the other side of the rail (1), characterized in that the mounting element is a strip (2) which has an angular profile and has two limbs (21; 22) which are provided for holding the rail (1), the first limb (21) of which has openings (23) for the passing through of fixing screws (24) which can be connected to the wall (9), and the second limb (22) of which has a T-profile-shaped longitudinal slot (25) which is open towards the rail (1) and serves for holding and for retaining a locking element (3) which is connected by means of a thread to a mounting screw (32) serving for retaining the rail (1), wherein the locking element (3) is at least approximately of cuboidal design, so that it is introduced in a longitudinal orientation into the T-profile-shaped longitudinal slot (25), and can be rotated therein into a retaining position, after which the mounting screws (32) can be tightened.

2. Fixing device according to claim 1, characterized in that the openings (23) are arranged in a depression suitable for holding the head of the fixing screw (24), in a channel (26) running along the first limb (21).

3. Fixing device according to claim 1, characterized in that, on the side facing away from the rail (1), the first limb (21) is provided with longitudinal grooves (27) which serve for holding retaining splines (41) of a spacer element (40).

4. Fixing device according to claim 1, characterized in that the two limbs (21, 22) of the strip (2), which is manufactured from metal, are at least approximately perpendicular with respect to each other.

5. Fixing device according to claim 1, characterized in that the thread (31) of the locking element (3) or of the associated mounting screws (32) is provided with a viscous substance or paint.

6. Fixing device according to claim 1, characterized in that the lengths of the limbs (21, 22) are selected in accordance with the dimensions of the rail (1), so that steps at the transitions between the rail (1) and strip (2) are avoided.

7. Fixing device according to claim 1, characterized in that a covering (50) can be placed onto the ends of the rail (1) and of the strip (2).

8. Fixing device according to claim 1, characterized in that a covering (50) is provided with pins (51) which can be inserted into the T-profile-shaped longitudinal slot (25) or the channel (26).

9. Fixing device according claim 1, characterized in that the rail (1) is inserted into the strip (2) having an angular profile and is retained by locking elements (3) introduced into the T-profile-shaped longitudinal slot (25) and corresponding mounting screws (32).

* * * * *